No. 787,246.

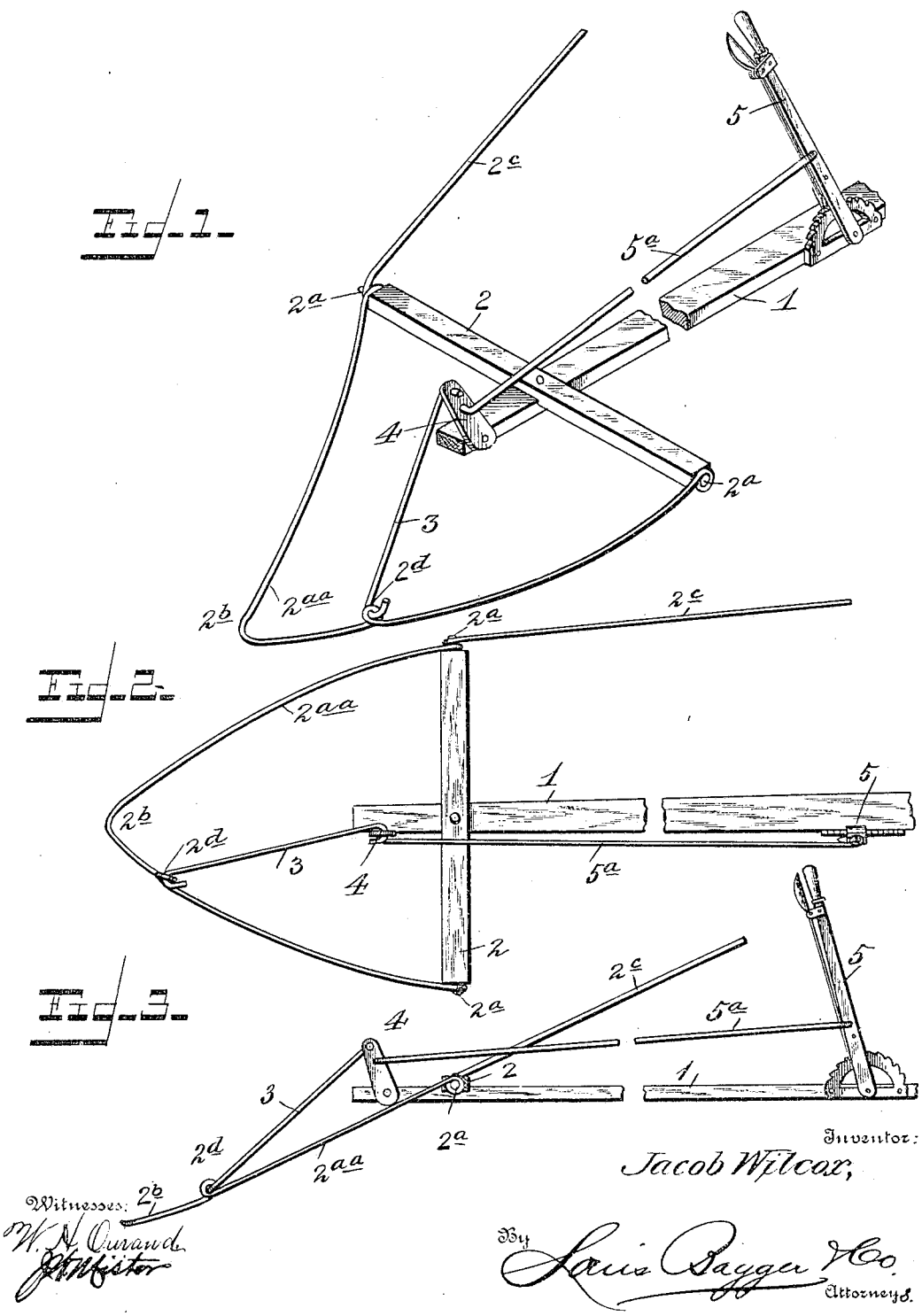

Patented April 11, 1905.

UNITED STATES PATENT OFFICE.

JACOB WILCOX, OF AMLIN, OHIO.

ATTACHMENT FOR CORN-HARVESTERS.

SPECIFICATION forming part of Letters Patent No. 787,246, dated April 11, 1905.

Application filed November 22, 1904. Serial No. 233,840.

*To all whom it may concern:*

Be it known that I, JACOB WILCOX, a citizen of the United States, residing at Amlin, in the county of Franklin and State of Ohio, have invented new and useful Improvements in Attachments to Corn-Harvesters, of which the following is a specification.

My invention relates to improvements generally in corn-harvesters, more especially attachments therefor for lifting and carrying the corn into the path of the action of the cutters.

It has for its object, as above noted, to lift and carry any careening or prostrated corn into position to be as readily engaged by the cutters of the harvester as the standing corn and to do this in an expeditious and effective manner, as also to provide for the ready adjustment and retention in operative position of the working parts.

Said invention consists of the detailed structural features, substantially as hereinafter more fully disclosed, and particularly pointed out by the claims.

In the accompanying drawings, Figure 1 is a perspective view of my invention as applied for use to the forward end of the tongue or pole of a corn-harvester. Fig. 2 is a plan view of the same. Fig. 3 is an edge or lateral elevation thereof viewing it from the right.

In constructing my invention or device I firmly secure upon the tongue or draft-bar 1 of a corn-harvester, ahead of the team, near its outer or forward end, a cross-bar member 2, having at its ends lateral studs or pivots $2^a$, the purpose of which will be presently apparent. Another member or part of the device consists, preferably, of a stout wire or metal piece $2^{aa}$, bent into substantially the outline as disclosed, having an upturned forward tapering end or nose $2^b$, with its lateral divergent portions or arms fulcrumed upon the studs or pivots $2^a$ of the cross-bar member 2, one arm having a rearward extension $2^c$ to render the corn-engaging portion or side of the device fully effective for disposing or carrying the corn into the path of the cutters of the harvester. To the opposite arm of the member $2^a$, formed near its outer or forward end with a loop or eye $2^d$, is connected a link 3, one end being preferably bent into a hook taking into said loop or eye, while the other end of said link is similarly bent and engaged with an eye or hole in the upper end of an upstanding rocking lever 4, pivoted at its lower end laterally to the tongue or pole 1, near the extreme forward end of the latter. A ratchet-and-pawl adjusted and retained hand-lever 5 is suitably pivoted also laterally to the tongue or pole 1, conveniently to the driver's seat, and has suitable connection with the rocking lever 4, as by wire or line $5^a$, itself suitably secured to said levers at its ends, respectively, whereby by the driver grasping and suitably moving said hand-lever the device may be adjusted at a predetermined height or position and there be held according to the angle the prostrated corn may stand to the surface for the requisite effectiveness in lifting and carrying the corn in the path of the cutters of the harvester.

It is noted that as the machine or harvester is engaged in its cutting operation any prostrated or careening corn will be intercepted or lifted and carried by this device into the path of the cutters of said machine and be equally cut with the standing corn, and thus provide for the thorough removal or harvesting of the corn—*i. e.*, as the machine is passing over the course of a previously-cut row of corn said device is effective to engage and elevate any "down" corn laterally thereof, as in subsequently cutting a row of corn parallel with the aforesaid corn-row.

This contrivance or device, it is apparent, may be adapted for either a right-hand or left-hand cutting-machine.

Latitude is allowed as to details herein, as they may be changed as circumstances suggest without departing from the spirit of my invention.

I claim—

1. A device of the character described, comprising a transverse or cross-bar member secured to the tongue or pole of a harvester, ahead of the team, and a tapering member with its divergent arms connected to said cross-bar and means for the retention of said tapering member in operative or effective position.

2. A device of the character described, employing a cross-bar member fixed upon a harvester pole or tongue, ahead of the team, and having lateral pivots, and a tapering member with its divergent portions or arms fulcrumed upon said pivots, and means for the adjustment and retention of said tapering member in effective position.

3. A device of the character described, employing a cross-bar member fixed upon a harvester pole or tongue, ahead of the team, and having lateral pivots, a tapering member with its divergent rear end portions fulcrumed upon said pivots, a rocking lever pivoted upon said tongue or pole, a link effecting connection between said lever and said tapering member, and a hand-lever having connection with said rocking lever.

4. A device of the character described, employing a cross-bar member fixed upon a harvester pole or tongue, ahead of the team, and having lateral pivots, a tapering metal member having its rear divergent portions fulcrumed at their extreme rear ends upon said pivots, one divergent portion having rearward extension beyond its pivot, a rocking lever pivoted laterally to said tongue, forward of said cross-bar, and having link connection with said tapering member, and a suitably-held hand-lever also pivoted laterally to said tongue or pole and having link connection with said rocking lever.

In testimony whereof I affix my signature in presence of two subscribing witnesses.

JACOB WILCOX.

Witnesses:
E. C. PERRY,
LOU ELZEY.